United States Patent
Yamada

(10) Patent No.: US 9,411,945 B2
(45) Date of Patent: Aug. 9, 2016

(54) IMAGE PROCESSING APPARATUS THAT PERFORMS USER AUTHENTICATION, AUTHENTICATION METHOD THEREFOR, AND STORAGE MEDIUM

(71) Applicant: CANON KABUSHIKI KAISHA, Tokyo (JP)

(72) Inventor: Tetsuya Yamada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/269,642

(22) Filed: May 5, 2014

(65) Prior Publication Data

US 2014/0337970 A1 Nov. 13, 2014

(30) Foreign Application Priority Data

May 8, 2013 (JP) .................................. 2013-098409

(51) Int. Cl.
*G06F 21/00* (2013.01)
*G06F 21/31* (2013.01)

(52) U.S. Cl.
CPC ...................................... *G06F 21/31* (2013.01)

(58) Field of Classification Search
None
See application file for complete search history.

(56) References Cited

U.S. PATENT DOCUMENTS

2013/0318585 A1* 11/2013 Hosoda ................. G06F 21/335
   726/7
2013/0347097 A1* 12/2013 Pan .......................... G06F 21/31
   726/17

FOREIGN PATENT DOCUMENTS

JP   2004-122778 A   4/2004
JP   2007280039 A   10/2007

OTHER PUBLICATIONS

Korean Office Action issued in Korean counterpart application No. KR10-2014-0053170, dated Feb. 2, 2016.

* cited by examiner

*Primary Examiner* — Ghazal Shehni
(74) *Attorney, Agent, or Firm* — Rossi, Kimms & McDowell LLP

(57) ABSTRACT

An image processing apparatus capable of an authentication technique which enables appropriate user authentication on an application-by-application basic without requiring users to perform time-consuming operations. A storage unit stores authentication method setting information in which authentication methods for respective ones of a plurality of applications are set. An authentication method determination unit determines an authentication method for use in authentication to be performed before a selected application is executed, based on the authentication method setting information. An authentication unit performs the authentication using the authentication method determined by the authentication method determination unit. The authentication methods include at least a first authentication method that does not require input of authentication information and a second authentication method that requires input of the authentication information.

11 Claims, 8 Drawing Sheets

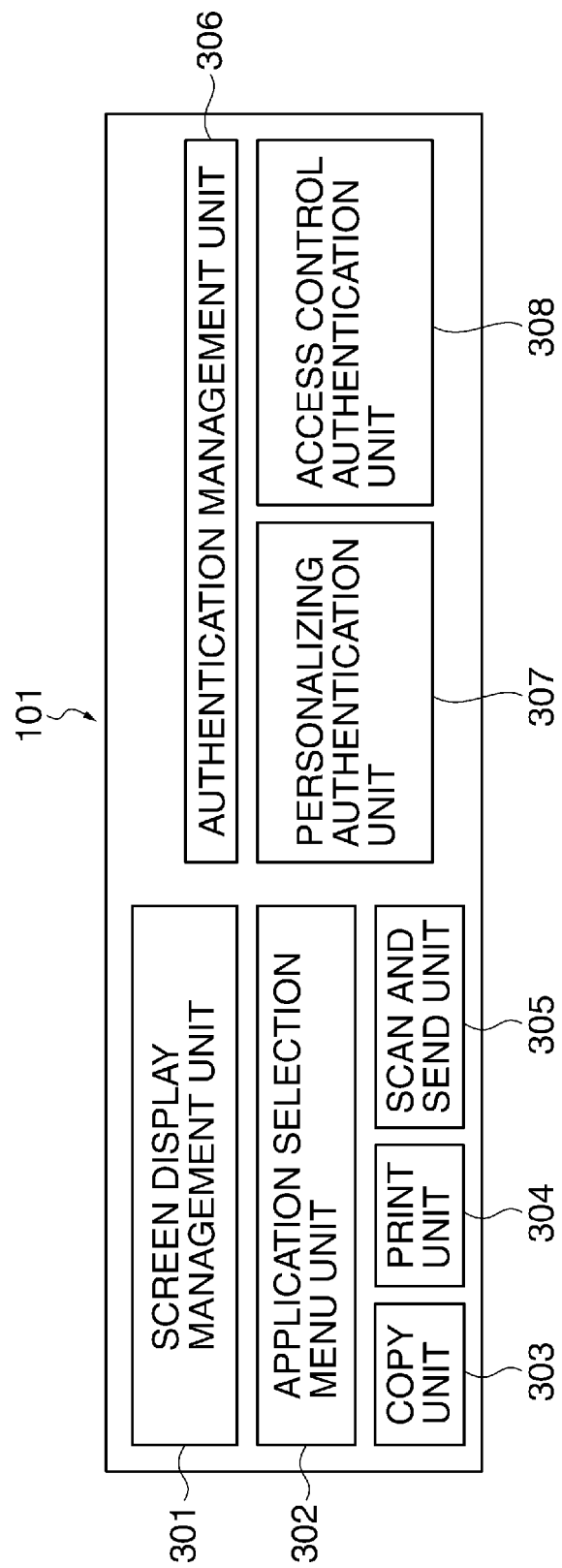

IMAGE PROCESSING APPARATUS THAT PERFORMS USER AUTHENTICATION, AUTHENTICATION METHOD THEREFOR, AND STORAGE MEDIUM

BACKGROUND OF THE INVENTION

1. Field of the Invention

The present invention relates to an image processing apparatus and an authentication method therefor, as well as a computer-readable storage medium storing a program for implementing the authentication method, and in particular to a technique for, in an image processing apparatus having a plurality of functions, performing authentication of a plurality of users using the functions.

2. Description of the Related Art

Image processing apparatuses such as MFPs (multi function peripherals) have applications such as copy, print, and scan and send applications so as to realize a plurality of functions such as copying, printing, and sending of scanned-in images. Many of image processing apparatuses have a user authenticating function from a security standpoint because they are shared by a plurality of users.

There is so-called function-by-function authentication in which users are identified by user authentication and usage by users is allowed and restricted, on an application-by-application basis. In this function-by-function authentication, when an image processing apparatus is started, an application selection menu is displayed, and when an application selected by a user is unavailable to the user, the user is requested to be authenticated for the first time. For example, there has been proposed a technique that allows every user to use a copy application, and on the other hand, allows only users who nave been successfully authenticated to use a scan and send application (Japanese Laid-Open Patent Publication (Kokai) No. 2004-122778).

According to the above conventional technique, when an application that does not require user authentication is used, there is no need to perform time-consuming operations such as input of authentication information and biological information. On the other hand, when an application that requires user authentication is used, a user is requested to input authentication information such as a password and biological information such as a fingerprint, and thus time-consuming operations are required.

When an application that requires user authentication is used, however, input of authentication information and others is required with no exceptions even when the application is not for security but is to customize operation screens, display settings, and so forth on a user-by-user basis. As a result, a user is required to perform time-consuming operations. Moreover, simplifying user authentication across the hoard could compromise security.

SUMMARY OF THE INVENTION

The present invention provides an image processing apparatus using an authentication technique which enables appropriate user authentication on an application-by-application basis without requiring users to perform time-consuming operations, an authentication method therefor, and a computer-readable storage medium storing a program for implementing the authentication method.

Accordingly, a first aspect of the present invention provides an image processing apparatus that has a plurality of applications and realizes a predetermined function by executing an application selected from among the plurality of applications by a user, comprising a storage unit configured to store authentication method setting information in which authentication methods for respective ones of the plurality of applications are set, an authentication method determination unit configured to, based on the authentication method setting information, determine an authentication method for use in authentication to be performed before the selected application is executed, and an authentication unit configured to perform the authentication using the authentication method determined by the authentication method determination unit, wherein the authentication methods include at least a first authentication method that does not require input of authentication information and a second authentication method that requires input of the authentication information.

Accordingly, a second aspect of the present invention provides an authentication method for an image processing apparatus that has a plurality of applications and realizes a predetermined function by executing an application selected from among the plurality of applications by a user, comprising an authentication method determination step of, based on the authentication method setting information in which authentication methods for respective ones of the plurality of applications are set, determining an authentication method for use in authentication to be performed before the selected application is executed, and an authentication step of performing the authentication using the authentication method determined in the authentication method determination step, wherein the authentication methods include at least, a first authentication method that does not require input of authentication information and a second authentication method that requires input of the authentication information.

Accordingly, a third aspect of the present invention provides a non-transitory computer-readable storage medium storing a program readable by a computer for causing an image processing apparatus to execute an authentication method for an image processing apparatus that has a plurality of applications and realizes a predetermined function by executing an application selected from among the plurality of applications by a user, the authentication method comprising an authentication method determination step of, based on the authentication method setting information in which authentication methods for respective ones of the plurality of applications are set, determining an authentication method for use in authentication to be performed before the selected application is executed, and an authentication step of performing the authentication using the authentication method determined in the authentication method determination step, wherein the authentication methods include at least a first authentication method that does not require input of authentication information and a second authentication method that requires input of the authentication information.

According to the present invention, before an application selected by the user is executed, an authentication method is determined based on the authentication method setting information. As a result, when the first authentication method that performs authentication which does not require input of authentication information for the purpose of user identification is set, authentication is performed using the first authentication method. On the other hand, when the second authentication method that requires input of authentication information for the purpose of restricting use of an application is set, authentication is performed using the second authentication method. Therefore, user authentication can be performed using an appropriate method on an application-by-application basis without requiring the user to carry out time-consuming operations.

Further features of the present invention will become apparent from the following description of exemplary embodiments (with reference to the attached drawings).

BRIEF DESCRIPTION OF THE DRAWINGS

FIG. 3 is a block diagram showing a software arrangement of the MFP in FIG. 1.

FIGS. 4A to 4C are views showing exemplary screens displayed on an operation unit of the MFP, in which FIG. 4A shows an application selection menu screen, FIG. 4B shows a personalizing authentication screen, and FIG. 4C shows an access control authentication screen.

FIGS. 5A to 5C are views showing exemplary tables held in an HDD of the MFP, in which FIG. 5A shows a table for use in determining an application authentication method, FIG. 5B shows a table for use in performing personalizing authentication, and FIG. 5C shows a table for use in performing access control authentication.

DESCRIPTION OF THE EMBODIMENTS

The present invention will now be described in detail with reference to the drawings showing embodiments thereof.

Figure 1:
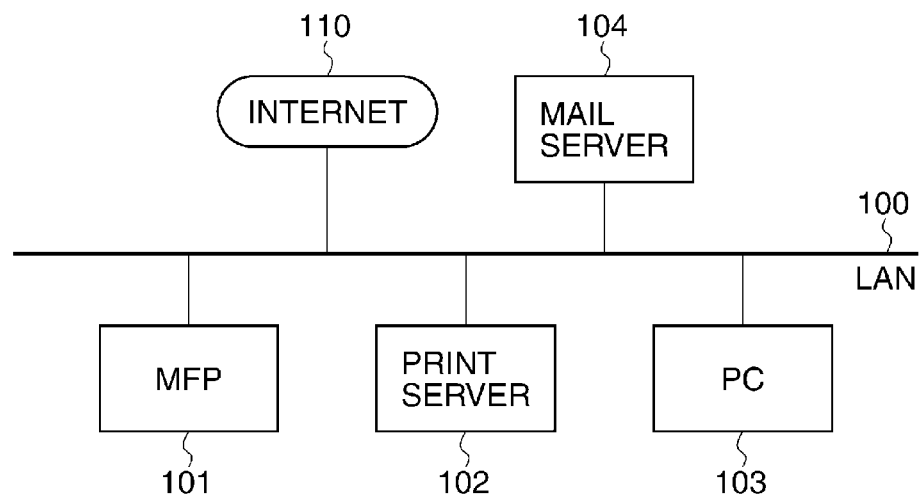
FIG. 1 is a diagram showing an exemplary network environment in which an image processing apparatus according to a first embodiment of the present invention is placed.

FIG. 1 is a diagram showing an exemplary network environment in which an image processing apparatus according to a first embodiment of the present invention is placed.

An MFP 101 is a multi function peripheral (image processing apparatus) having a plurality of functions such as a copy function, a print function, a scanner function, and a network communication function. The MFP 101 is connected to a LAN 100 to which a print server 102, a PC (personal computer) 103, and a mail server 104 are connected. The LAN 100 is connected to the Internet 110.

A user creates print jobs using the PC 103. Print jobs transmitted from the PC 103 are retained in the print server 102. The MFP 101 accesses the print server 102 in accordance with an instruction from a user and obtains a desired print job from the print server 102. The MFP 101 performs printing of the print job obtained from the print server 102.

The MFP 101 sends data of an image scanned in using the scanner function to the mail server 104 via the LAN 100. The PC 103 obtains image data stored in the mail server 104 and makes the image data available to the user. The mail server 104 is also able to send image data to a PC (not shown) connected to the Internet 110.

Figure 2:
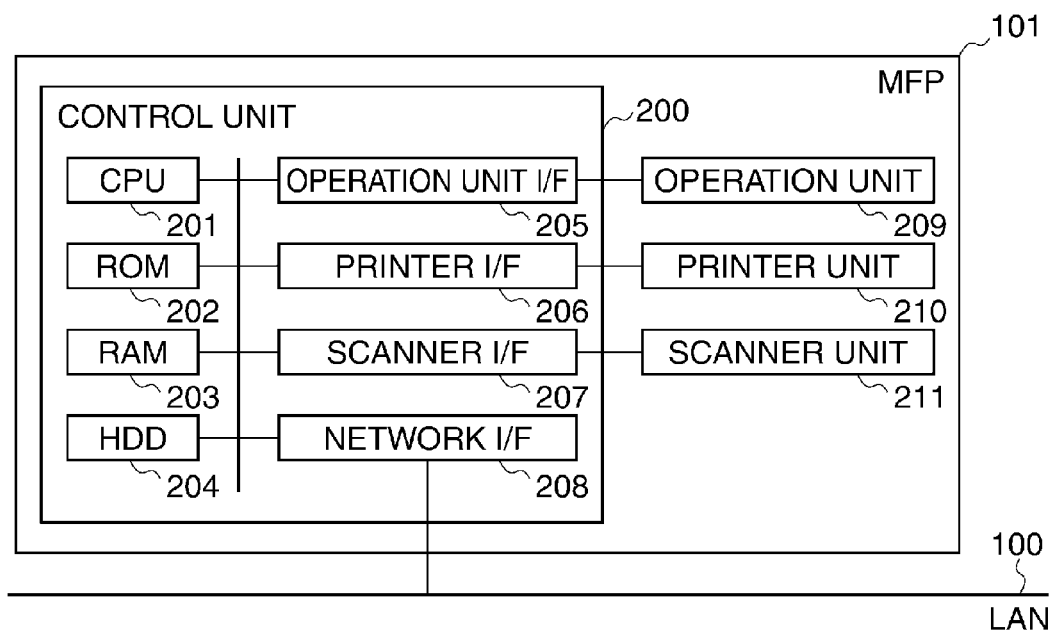
FIG. 2 is a block diagram showing a hardware arrangement of an MFP in FIG. 1.

FIG. 2 is a block diagram showing a hardware arrangement of the MFP 101 in FIG. 1

A control unit 200 including a CPU 201 controls the overall operation of the MFP 101. The CPU 201 reads out control programs stored in a ROM 202 to provide various types of control such as reading control and transmission control. A RAM 203 is used as a temporary storage area such as a main memory and a work area for the CPU 201. An HDD 204 stores image data and various programs. An operation unit I/F 205 is an interface (I/F) that controls exchange of information between an operation unit 209 and the control unit 200.

A printer I/F 206 is an I/F that controls exchange of information between a printer unit 210 and the control unit 200. The printer unit 210 prints image data, which is transferred from the control unit 200 via the printer I/F 206, on a recording medium.

A scanner I/F 207 is an I/F that controls exchange of information between a scanner unit 211 and the control unit 200. The scanner I/F 207 reads an image off an original to generate image data and outputs the image data to the control unit 200 via the scanner I/F 207.

A network I/F 208 is a communication I/F that controls exchange of information between the control unit 200 and the LAN 100. The network I/F 208 sends image data and information to and receives a variety of information from the printer server 102, the PC 103, and so forth on the LAN 100.

It should be noted that according to the present embodiment, in the MFP 101, one CPU 201 carries out processes in a flowchart, to be described later, using one memory (the RAM 203 or the HDD 204), but any other form may be used. For example, a plurality of CPUs or a plurality of RAMs or HDDs may cooperate with each other to carry out the processes in the flowchart.

FIG. 3 is a block diagram showing a software arrangement of the MFP 101 in FIG. 1. Blocks in FIG. 3 are software modules stored in the ROM 202 or the HDD 204 of the MFP 101 and are executed by the CPU 201 of the MFP 101 to realize predetermined functions described hereafter.

An image display management unit 301 has a function of controlling images, a variety of information, and so on to be displayed on the operation unit 209.

Figure 4A:
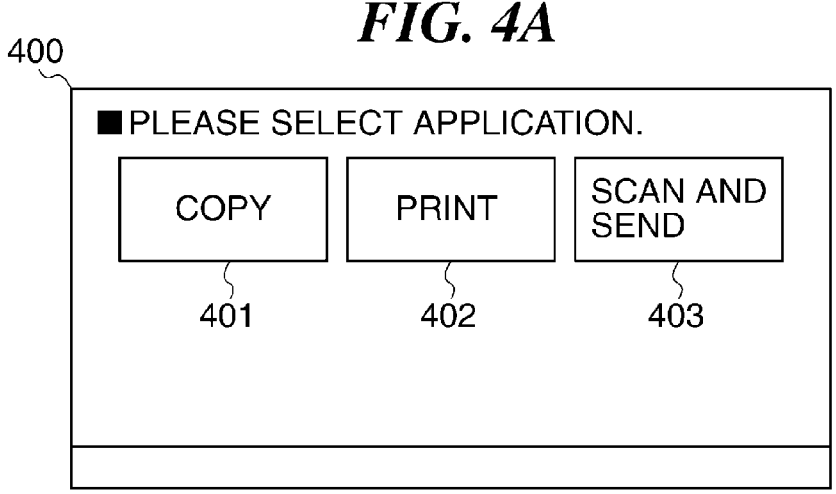

An application selection menu unit 302 has a function of displaying an application selection menu screen (hereafter referred to merely as "the menu screen") which prompts the user to select a desired application from a plurality of applications, to be described later, on the operation unit 209. FIG. 4A shows an example of the menu screen.

Three buttons consisting of a copy button 401, a print button 402, and a scan and send button 403 are disposed on the menu screen 400. In response to a user depressing any of these buttons, a selected application is executed by the MFP 101. It should be noted that although in the example shown in the figure, there are only the three buttons, the present invention is not limited to this.

A copy unit 303 is an application for realizing the copy function. A print unit 304 is an application for executing a received print job to realize the print function. A scan and send unit 305 is an application for realizing a function of sending an image, which is scanned in by the scanner unit 211, to an external apparatus by mail or the like. It should be noted that although in the example shown in the figure, the three applications consisting of the copy unit 303, the print unit 304, and the scan and send unit 305 are shown, the present invention is not limited to this.

An authentication management unit 306 has a function of managing whether or not authentication is necessary for a user to use various applications such as the copy unit 303 and the print unit 304, and when necessary, which authentication is needed. The authentication management unit 306 performs authentication on an application-by-application basis by referring to an authentication method determination table 701 (authentication method setting information) as shown in FIG.

Figure 5A:
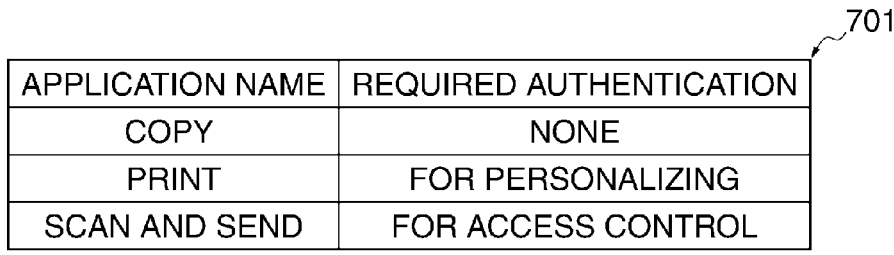

5A, which is held in the HDD 204. In the authentication method determination table 701, application names and required authentication methods are associated with each other. For example, when a user selects copying by depressing the copy button 401 on the menu screen 400, authentication is not performed. On the other hand, when printing is selected by depressing the print button 402, personalizing authentication is required. Further, when sending after scanning is selected by depressing the scan and send button 403, access control authentication is required. It should be noted that contents of the authentication method determination table 701 shown in FIG. 5A can be set and changed by an administrator of the MFP 101 via the operation unit 209 or by a remote control from the PC 103 and so on. Moreover, although in the present embodiment, the authentication method can be set for respective ones of the plurality of applications according to the authentication method determination table 701 shown in FIG. 5A, other tables can be also used. For example, the authentication method can be set in common for the plurality of applications, which the MFP 101 has.

Figure 4B:
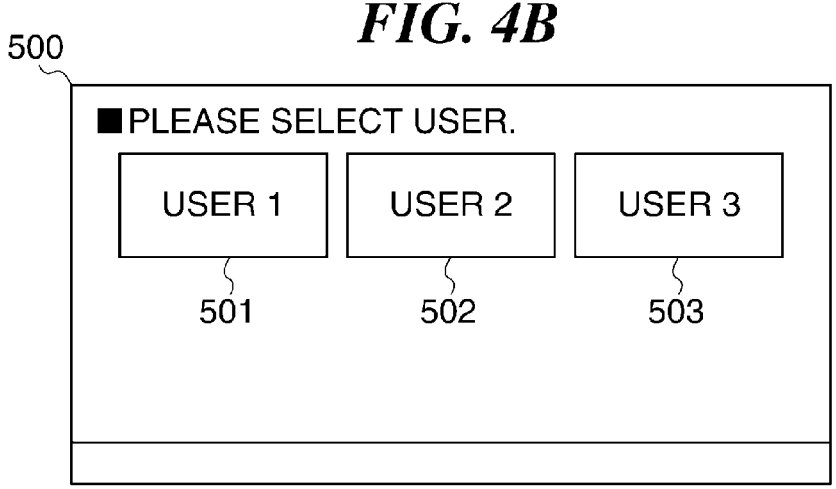

A personalizing authentication unit 307 has a function of executing an authentication method (first authentication method) that does not require input of authentication information such as a password for the purpose of user identification. FIG. 4B shows an exemplary screen displayed on the operation unit 209 when the personalizing authentication unit 307 performs user authentication.

On a personalizing authentication screen 500 in FIG. 4B, buttons 501 to 503 representing users are displayed. It should be noted that although in the example shown in the figure, "User 1", "User 2", and "User 3" are written on the buttons 501 to 503, identifiable information such as user names, IDs, and nicknames (user identification information) which can be set by users themselves are displayed.

Figure 5B:
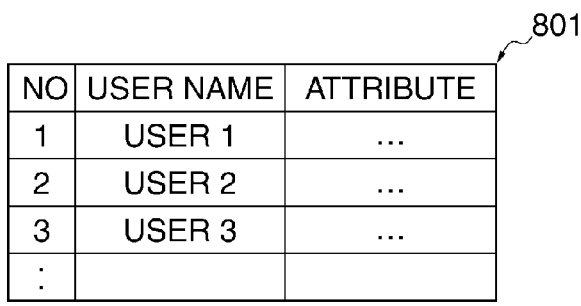

When a user depresses a button corresponding to him or her among the buttons 501 to 503, the personalizing authentication unit 307 performs personalizing authentication by referring to an authentication table 801 which is held by the HDD 204 as shown in FIG. 5B. In the authentication table 801, user names and attribute information are associated with each other. User information such as places to which the users belong, setting information on user-specific applications, and information on operation screens for the user-specific applications are stored as the attribute information.

Figure 4C:
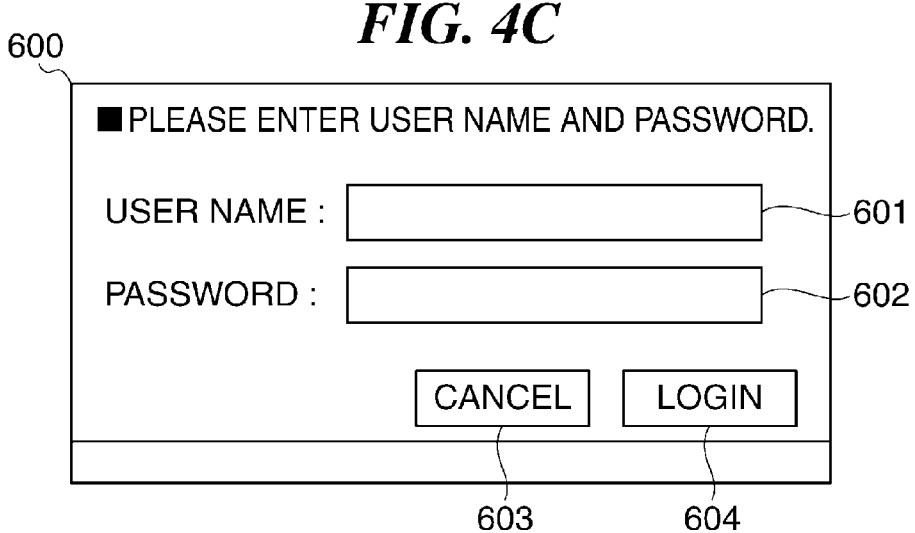

The access control authentication unit 308 has a function of executing an authentication method (second authentication method) that requires input of authentication information for the purpose of restricting use of applications so as to perform stricter user authentication than that by the personalizing authentication unit 307. FIG. 4C shows an exemplary screen displayed on the operation unit 209 when the access control authentication unit 308 performs user authentication.

On an access control authentication screen 600 in FIG. 4C, a user name entry field 601, a password entry field 602, a cancel button 603, and a login button 604 are displayed.

Figure 5C:
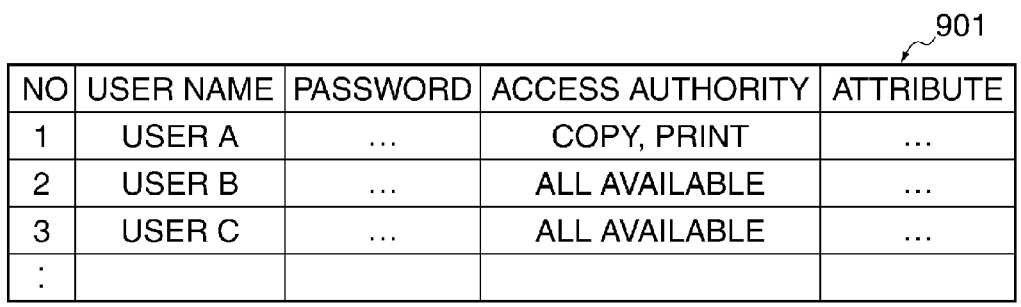

When a user enters a user name into the user name entry field 601, enters a password into the password entry field 602, and depresses the login button 604, the access control authentication unit 308 performs authentication by referring to an authentication table 901 in FIG. 5C, which is held in the HDD 204.

In the authentication table 901 in FIG. 5C, user names, passwords, access authorities, and attribute information are associated with each other. Application usage rights set for respective users are set as the access authorities. In the example shown in the figure, a user A is authorized to use only copying and printing after being successfully authenticated, whereas a user B is authorized to use all the applications. In the present embodiment, it is assumed that the authentication table 901 is stored in the HDD 204, the authentication table 901 may be held by an authentication server (not shown) which is connected to the LAN 100. In this case, the authentication server may comprise an LDAP (Lightweight Directory Access Protocol) server and an Active Directory server. The access control authentication unit 308 sends a user name and a password received by the user to the authentication server to request authentication. When the authentication is successful, the access control authentication unit 308 receives access information and an attribute for the authenticated user as an authentication result by the authentication server.

Figure 6:
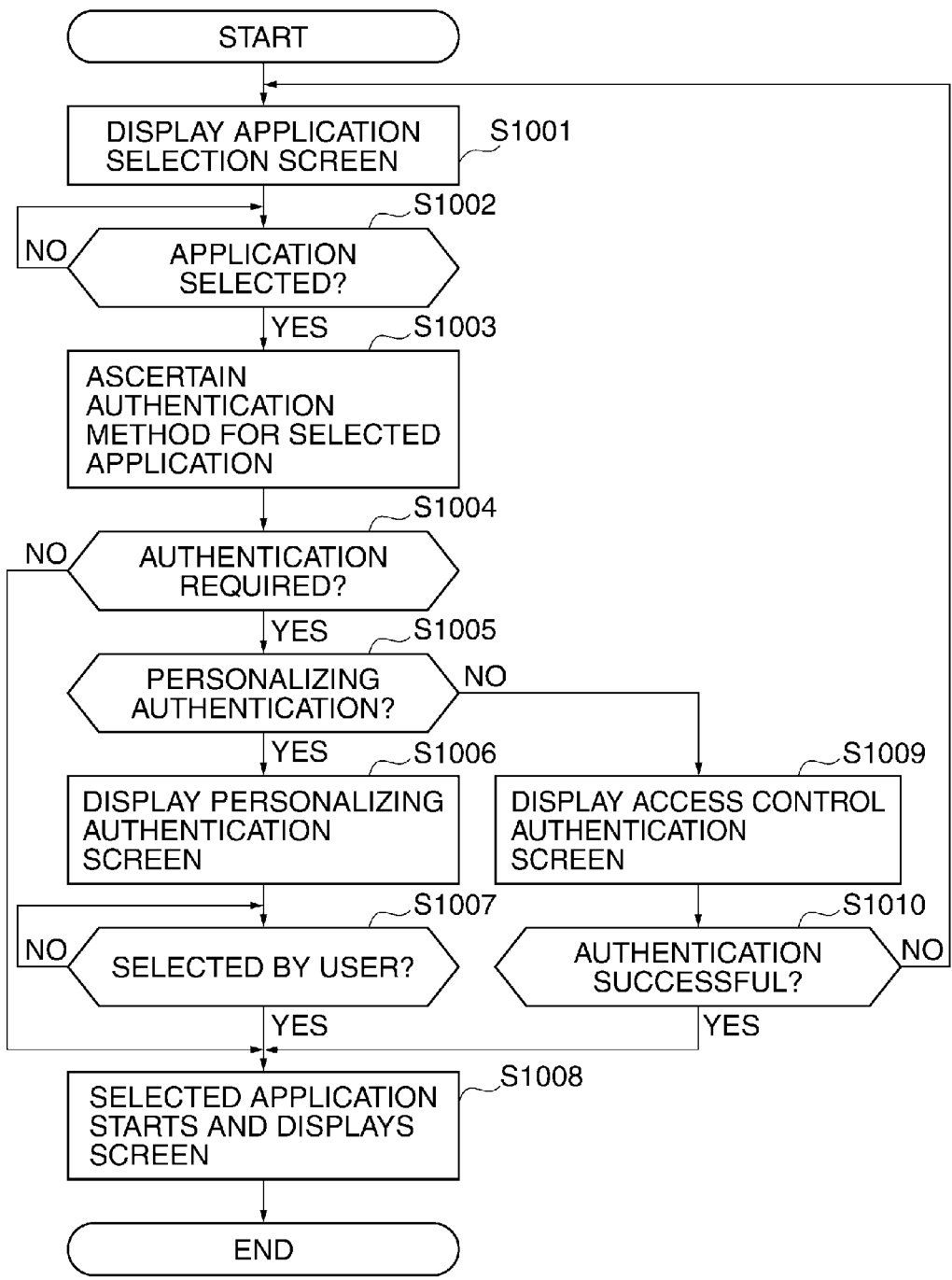
FIG. 6 is a flowchart showing the flow of a process carried out to select an application of the MFP according to the first embodiment.

Referring next to FIG. 6, a description will be given of how the MFP 101 provides an authentication function required for a user to use an application.

FIG. 6 is a flowchart showing the flow of a process carried out to select an application of the MFP 101 according to the first embodiment. The illustrated process is realized by the CPU 201 of the MFP 101 executing any of software in FIG. 3.

When the MFP 101 is started, the screen display management unit 301 controls the application selection menu unit 302 to display the menu screen 400 on the operation unit 209 (step S1001).

When an application is selected by detecting depression of a button on the menu screen 400 by a user (YES in step S1002), the application selection menu unit 302 notifies the authentication management unit 306 of the selected application via the screen display management unit 301.

The authentication management unit 306 then ascertains an authentication method for the selected application by referring to the authentication method determination table 701 (step S1003) to determine whether or not authentication is necessary (step S1004). Upon determining that authentication is unnecessary (NO in the step S1004), the authentication management unit 306 requests the application selected in the step S1002 to start. As a result, the application which has started displays a screen for this application via the screen display management unit 301 (step S1008). For example, when the copy button 401 is depressed on the menu screen 400, it is determined in the step S1004 that user authentication is unnecessary, and the copy unit 303 displays a screen for the application.

On the other hand, when the authentication management unit 306 determines in the step S1004 that user authentication is necessary (YES in the step S1004) and determines that authentication is for personalizing (YES in the step S1005), the process proceeds to step S1006.

In the step S1006, the personalizing authentication unit 307 causes the screen display management unit 301 to display the personalizing authentication screen 500 on the operation unit 209.

Figure 7:
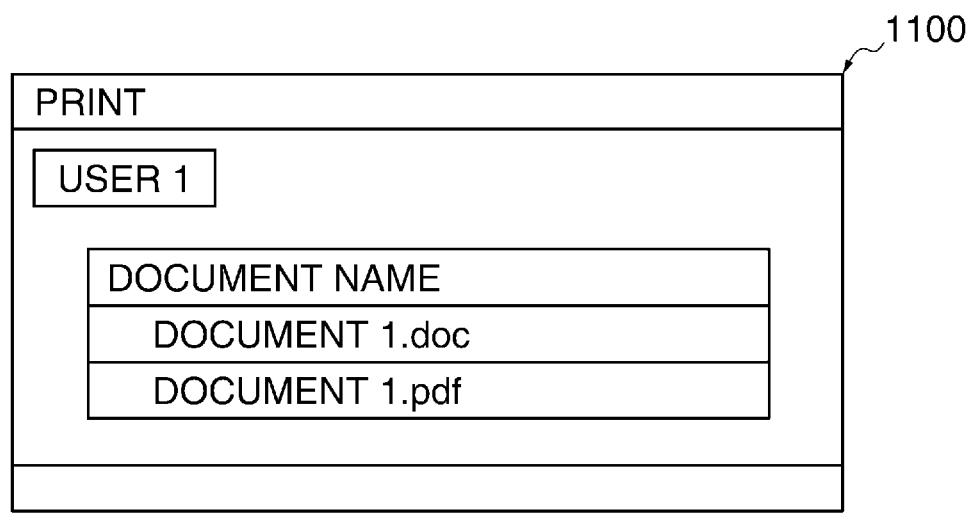
FIG. 7 is a view showing an exemplary print screen displayed on the operation unit of the MFP.

Then, upon detecting depression of a button of the personalizing authentication screen 500 and determining that a user has been selected (step S1007), the personalizing authentication unit 307 performs personalizing authentication by referring to the authentication table 801. The personalizing authentication unit 307 then requests the application selected in the step S1002 to start. As a result, the application which has started displays a screen for this application via the screen display management unit 301 (step S1008). For example, when the print button 402 is depressed on the menu screen 400, the personalizing authentication unit 307 displays the personalizing authentication screen 500, and then the print unit 304 displays a print screen 1100 as shown in FIG. 7. The print screen 1100 in FIG. 7 is an exemplary screen obtained by personalizing an operation screen using the attribute information in FIG. 5B. On the print screen 1100 shown in FIG. 7, a list of print jobs for a selected user 1 among jobs stored in the MFP 101 is displayed.

When the authentication management unit 306 determines in the step S1004 that authentication is necessary (YES in the step S1004) and determines that authentication is not for personalizing (NO in the step S1005), the process proceeds to step S1009.

In the step S1009, the access control authentication unit 308 causes the screen display management unit 301 to display the access control authentication screen 600 on the operation unit 209.

Next, when the login button 604 is depressed after a user name and a password are entered on the access control authentication screen 600, the access control authentication unit 308 performs authentication by referring to the authentication table 901 based on the authentication information. When authentication is successful (YES in step S1010), the access control authentication unit 308 requests the application selected in the step S1002 to start. As a result, the application which has started displays a screen for this application via the screen display management unit 301 (step S1008). For example, when the scan and send button 403 is depressed on the menu screen 400, the access control authentication unit 308 displays the access control authentication screen 600. When authentication is successful, the scan and send unit 305 displays a scan and send screen (not shown).

When authentication is unsuccessful in the step S1010 (NO in the step S1010), the process returns to the step S1001, in which the menu screen 400 is displayed.

According to the first embodiment described above, before an application selected by a user is executed, an authentication method is determined using the authentication method determination table 701. As a result, when personalizing authentication is set as an authentication method, the personalizing authentication unit 307 performs authentication that does not require input of authentication information for the purpose of user identification. On the other hand, when access control authentication is set as an authentication method, the access control authentication unit 308 performs authentication that requires input of authentication information for the purpose of restricting usage of applications. This enables user authentication to be performed using an appropriate method on an application-by-application basis without requiring a user to perform time-consuming consuming operation.

Although in the embodiment described above, there are the two tables consisting of the authentication tables 801 and 901, the present invention is not limited to this, but an arrangement using only the authentication table 901 may be used.

An image processing apparatus according to a second embodiment of the present invention has the same arrangement (FIGS. 1 to 3) as that of the image processing apparatus according to the first embodiment, and the same components as those of the first embodiment are designated by the same reference symbols, description of which, therefore, is omitted. Only those differing from the first embodiment will be described below. In the present embodiment, it is assumed that an authentication table for use in performing user authentication is shared.

FIG. 3 is a flowchart showing the flow of a process carried out in order to select an application of the MFP 101 according to the second embodiment of the present invention. The illustrated process is realized by the CPU 201 of the MFP 101 executing any of software in FIG. 3. In the illustrated process, description of parts overlapping those of the process in FIG. 6 is omitted, and only those differing from the process in FIG. 6 will be described below.

Figure 8:
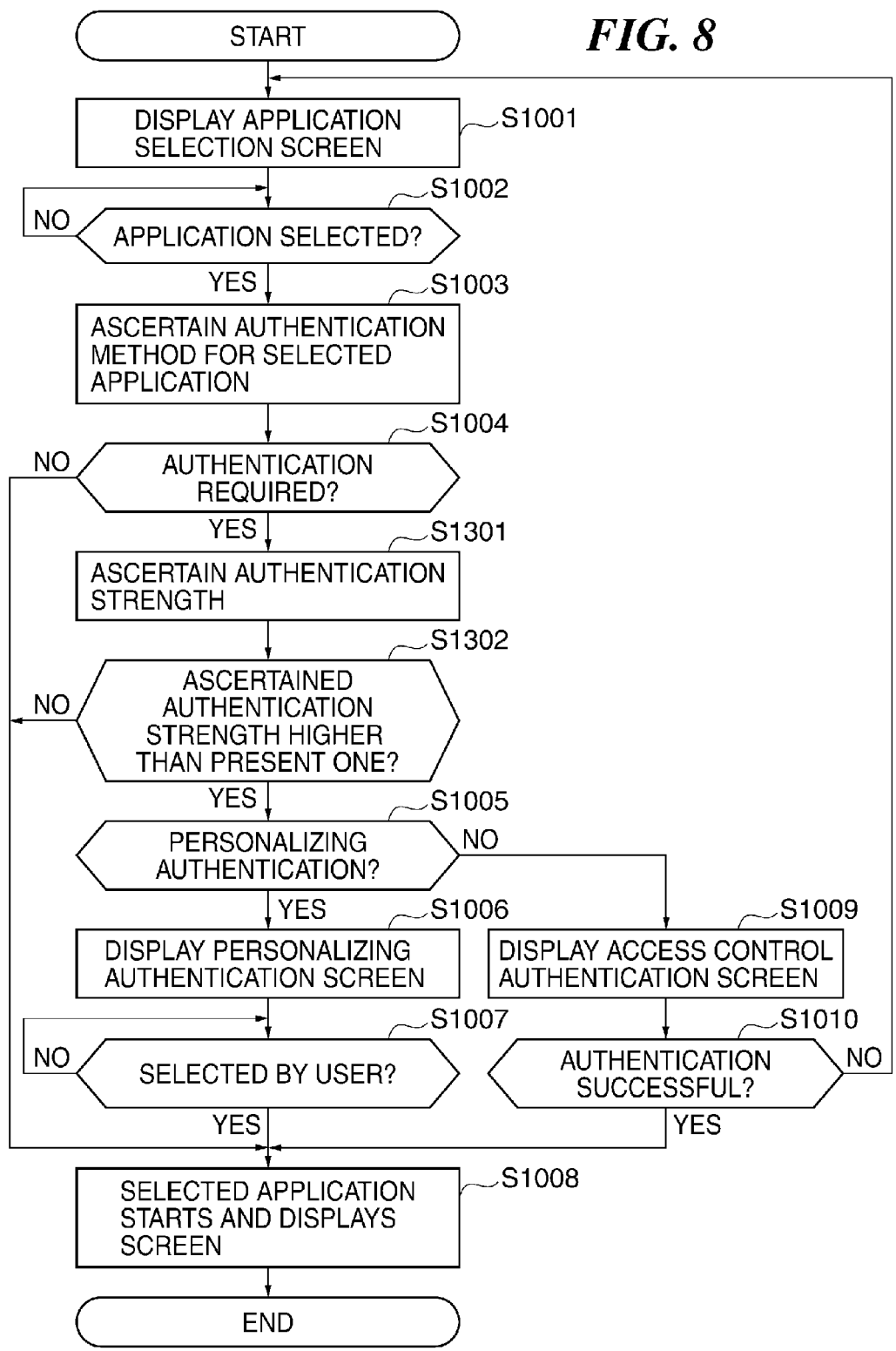
FIG. 8 is a flowchart showing the flow of a process carried out to select an application of the MFP according to a second embodiment of the present invention.

The process in FIG. 8 is carried out in a state in which the process in FIG. 6 has already been carried out, and a user has already been authenticated.

Figure 9:
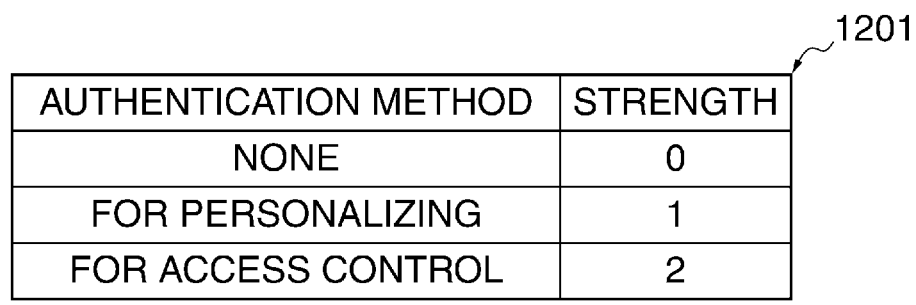
FIG. 9 is a view showing an exemplary table for use in determining an authentication strength held in the HDD of the MFP.

In step S1301, by referring to an authentication strength determination, table 1201 in FIG. 9 (authentication strength setting information), which is held in the HDD 204, the authentication management unit 306 ascertains an authentication strength of an authentication method for a selected application. Here, an authentication strength means a strictness of user authentication required for an authentication method, and the higher the authentication strength, the higher the strictness of user authentication, and for example, the larger the amount of authentication information. As described earlier, personalizing authentication does not require input of authentication information, and access control authentication requires input of authentication information. Thus, in access control authentication, stricter user authentication than personalizing authentication, that is, user authentication with high strength is performed (authentication strength is high).

When the authentication management unit 306 determines that a user is the same as the authenticated user, and the authentication strength ascertained in the step S1301 is equal to or lower than an authentication strength of a previous authentication method (NO in step S1302), the process proceeds to the step S1008. On the other hand, when the authentication strength checked in the step S1301 is higher than the authentication strength of the previous authentication method (YES in the step S1302), the processes in the steps S1005 and the subsequent steps are carried out.

FIG. 9 is a view showing an example of the authentication strength determination table 1201 which is managed by the authentication management unit 306 and in which different authentication strengths are set for respective authentication methods. It should be noted that in the example shown in the figure, the greater the value of authentication strength, the higher the authentication strength.

According to the second embodiment described above, in a case where after authentication is performed on a temporary basis, an application is further selected by the same user, an authentication strength of an authentication method for the selected application is compared with that of a previous authentication method. As a result, when the present authentication strength is equal to or lower than the previous authentication strength, control is provided so as not to perform authentication. This enables the user to continue operation without performing operation for authentication again and enhances convenience for the user.

Although in the first and second embodiments described above, authentication is performed using the two authentication programs consisting of the personalizing authentication unit 307 and the access control authentication unit 308, the present invention is not limited to this. For example, one authentication program may switch two operation modes consisting of a personalizing mode and an access control mode.

Moreover, although in the embodiments described above, the present invention is applied to an image processing apparatuses such as an MFP, it goes without saying that the same effects can be obtained even by applying the present invention to cellular phones including smartphones and information processing apparatuses such as portable terminals.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-098409 filed May 8, 2013, which is hereby incorporated by reference herein in its entirety.

What is claimed is:

1. An image processing apparatus that has a plurality of applications each set with an authentication method and realizes a predetermined function by executing an application selected from among the plurality of applications by a user, the image processing apparatus comprising: a memory; and a processor connected to the memory and configured to execute: a storage task that stores in a storage, authentication method setting information associated with the authentication methods of the plurality of applications; an authentication method determination task that determines, based on the authentication method setting information, the authentication method for use in authentication to be performed before executing the selected application; and an authentication task that performs the authentication using the authentication method determined by the authentication method determination task, wherein the authentication methods include at least a first authentication method that does not require input of authentication information and a second authentication method that requires the input of the authentication information.

2. The image processing apparatus according to claim 1, wherein: the storage task further stores authentication strength setting information in which different authentication strengths are set for respective ones of the authentication methods, and the processor is further configured to execute: an authentication strength determination task that determines, based on the authentication strength setting information, the authentication strength for the authentication method for use in the authentication to be performed before executing the selected application; and a control task that controls the authentication task to not perform authentication of the user who has selected a different application from among the plurality of applications when the user has been authenticated by the authentication task, and the authentication strength determined by the authentication strength determination task is equal or lower than the authentication strength of the previous authentication method used by the authentication task.

3. The image processing apparatus according to claim 1, wherein the first authentication method is authentication intended to identify the user who uses the selected application.

4. The image processing apparatus according to claim 3, wherein to perform the authentication using the first authentication method, the authentication task displays a plurality of user names on an operation screen and prompts the user to select user identification information.

5. The image processing apparatus according to claim 1, wherein the second authentication method is authentication intended to restrict use of the selected application.

6. The image processing apparatus according to claim 5, wherein the authentication task displays an operation screen that prompts input of a user name and a password to perform the authentication using the second authentication method.

7. The image processing apparatus according to claim 1, wherein: the storage task further stores in the storage, attribute information on users who use the image processing apparatus, and when the authentication method for the selected application is the first authentication method, an operation screen for the application is personalized using the attribute information corresponding to a user authenticated using the first authentication method.

8. The image processing apparatus according to claim 1, wherein the authentication methods include an authentication method that does not perform authentication of the user.

9. The image processing apparatus according to claim 1, wherein the authentication information comprises a password.

10. An authentication method for an image processing apparatus that has a plurality of applications each set with an authentication method and realizes a predetermined function by executing an application selected from among the plurality of applications by a user, the authentication method comprising: a storage step of storing in a storage, authentication method setting information associated with the authentication methods of the plurality of applications; an authentication method determination step of determining, based on the authentication method setting information, the authentication method for use in authentication to be performed before executing the selected application; and an authentication step of performing the authentication using the authentication method determined in the authentication method determination step, wherein the authentication methods include at least a first authentication method that does not require input of authentication information and a second authentication method that requires the input of the authentication information.

11. A non-transitory computer-readable storage medium storing a program executable by a computer for causing an image processing apparatus to execute an authentication method, the image processing apparatus having a plurality of applications each set with an authentication method and realizes a predetermined function by executing an application selected from among the plurality of applications by a user, the authentication method comprising: a storage step of storing in a storage, authentication method setting information associated with the authentication methods of the plurality of applications; an authentication method determination step of determining, based on the authentication method setting information, the authentication method for use in authentication to be performed before executing the selected application; and an authentication step of performing the authentication using the authentication method determined in the authentication method determination step, wherein the authentication methods include at least a first authentication method that does not require input of authentication information and a second authentication method that requires the input of the authentication information.

* * * * *